US011790545B2

(12) United States Patent
Chen et al.

(10) Patent No.: US 11,790,545 B2
(45) Date of Patent: Oct. 17, 2023

(54) METHOD AND APPARATUS TO CONTROL LIGHT SOURCE IN STRUCTURED LIGHT IMAGING

(71) Applicant: HIMAX TECHNOLOGIES LIMITED, Tainan (TW)

(72) Inventors: Wu-Feng Chen, Tainan (TW); Hsueh-Tsung Lu, Tainan (TW); Chengche Tsai, Tainan (TW); Ching-Wen Wang, Tainan (TW)

(73) Assignee: HIMAX TECHNOLOGIES LIMITED

( * ) Notice: Subject to any disclaimer, the term of this patent is extended or adjusted under 35 U.S.C. 154(b) by 332 days.

(21) Appl. No.: 17/019,373

(22) Filed: Sep. 14, 2020

(65) Prior Publication Data

US 2022/0084227 A1    Mar. 17, 2022

(51) Int. Cl.
*G06T 7/521* (2017.01)
*G06T 7/586* (2017.01)
*G06T 7/557* (2017.01)

(52) U.S. Cl.
CPC ............. *G06T 7/521* (2017.01); *G06T 7/557* (2017.01); *G06T 7/586* (2017.01)

(58) Field of Classification Search
None
See application file for complete search history.

(56) References Cited

U.S. PATENT DOCUMENTS

| 9,972,074 | B2 * | 5/2018 | Higashi ................... G06T 7/50 |
| 10,096,092 | B2 * | 10/2018 | Nakamae ............... G06V 10/44 |
| 10,157,451 | B2 * | 12/2018 | Higashi .................... G06T 5/20 |
| 10,217,195 | B1 * | 2/2019 | Agrawal .................. G06T 7/11 |
| 2005/0157939 | A1 | 7/2005 | Arsenault et al. |
| 2014/0035902 | A1 | 2/2014 | An et al. |
| 2017/0084009 | A1 * | 3/2017 | Higashi .................... G06T 7/50 |
| 2019/0130533 | A1 | 5/2019 | Ouyang et al. |
| 2019/0213953 | A1 * | 7/2019 | Koh ..................... G09G 3/3225 |
| 2022/0084227 | A1 * | 3/2022 | Chen .................... G01B 11/25 |

OTHER PUBLICATIONS

Non-Published Commonly Owned U.S. Patent Application, Filed on Sep. 14, 2020, 20 pages of written description and drawings.

* cited by examiner

*Primary Examiner* — Tahmina N Ansari
(74) *Attorney, Agent, or Firm* — SU IP CONSULTING

(57) ABSTRACT

An example method to control a light source in structured light imaging associated with a target includes obtaining two-dimensional image information and depth information of an image including the target and a scene, associating the depth information with pixels of the image, selecting a first set of pixels of the pixels based on a first set of the depth information and a second set of pixels of the pixels based on a second set of the depth information, calculating a first average pixel luminance (APL) of the first set of pixels and a total APL of the first and the second sets of pixels, obtaining a weighted APL based on the first APL and the total APL and controlling the light source based on the weighted APL.

21 Claims, 3 Drawing Sheets

METHOD AND APPARATUS TO CONTROL LIGHT SOURCE IN STRUCTURED LIGHT IMAGING

CROSS-REFERENCE TO RELATED APPLICATION

The present application is related in subject matter to U.S. application Ser. No. 17/019,371. The related U.S. Applications is incorporated herein by reference in its entirety.

BACKGROUND

Unless otherwise indicated herein, the approaches described in this section are not prior art to the claims in this application and are not admitted to be prior art by inclusion in this section.

Range imaging is widely used. High-powered lights are usually used in the range imaging. It becomes challenging to properly control the high-powered lights in various applications.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

The technical details set forth in the following description enable a person skilled in the art to implement one or more embodiments of the present disclosure.

Structured light imaging is one approach in range imaging and includes projecting a predefined pattern of lights on to a target in a scene. In addition, structured light imaging may capture a three-dimensional (3D) topography of the target by using a light source to provide specific patterns of lights to the target and an imaging camera (e.g., a 2D imaging camera or a 3D imaging camera). The imaging camera is configured to capture images of the patterns on the target from one or more different perspectives. A feature on the target may distort the patterns. The distorted patterns are used to reconstruct the 3D topography of the target. The lights used in the structured light imaging are usually high-powered lights, which may cause undesirable harms to the eyes of a living target (e.g., woman's eyes in FIG. 1). Properly controlling the high-powered lights from undesirable harms to eyes of living targets is needed.

Figure 1:
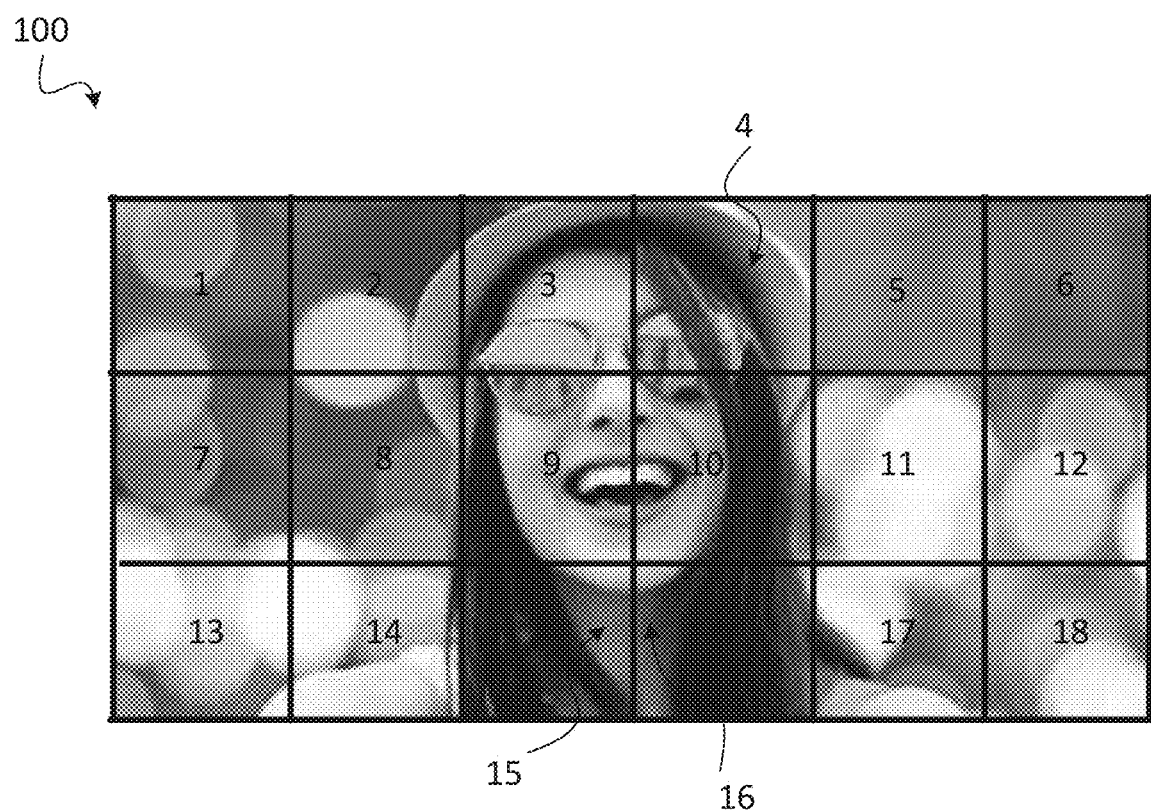
FIG. 1 illustrates an image including a target (e.g., woman), in accordance with at least some embodiments of the present disclosure.

FIG. 1 illustrates an example image 100, in accordance with at least some embodiments of the present disclosure. Image 100 includes a target (e.g., woman) and a scene. In addition, image 100 includes various pixels. In some embodiments, the target of image 100 is represented by pixels 3, 4, 9, 10, 15 and 16 and the scene of image 100 is represented by pixels 1, 2, 5, 6, 7, 8, 11, 12, 13, 14, 17 and 18.

Figure 2:
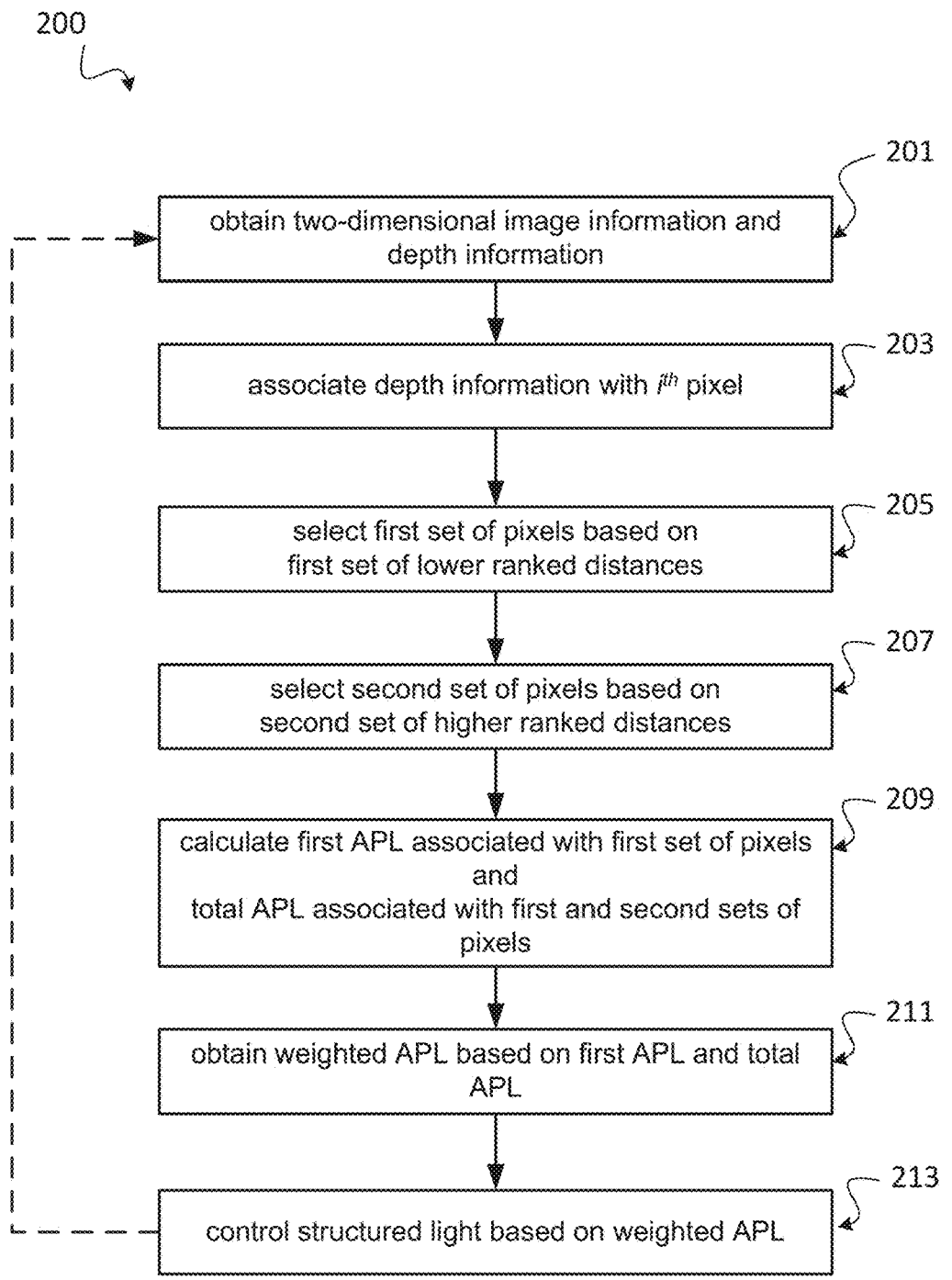
FIG. 2 is a flowchart of a method to control a light source in structured light imaging, in accordance with at least some embodiments of the present disclosure.

FIG. 2 is a flowchart of method 200 to control a light source in structured light imaging, in accordance with at least some embodiments of the present disclosure. Method 200 may include one or more operations, functions or actions as illustrated by one or more of operations 201, 203, 205, 207, 209, 211 and/or 213. The various operations may be combined into fewer operations, divided into additional operations, and/or eliminated based upon the desired implementation.

Method 200 may begin at operation 201, "obtain two-dimensional image information and depth information." In some embodiments, in conjunction with FIG. 1, a two-dimensional optical device may be used to capture image 100 and obtain two-dimensional image information of image 100. In some embodiments, in conjunction with FIG. 1, a depth sensor may be used to collect depth information. The depth sensor may be disposed on the two-dimensional optical device. In some embodiments, the "depth information" may correspond to distances of various points of the targets and in the scene to the depth sensor. In conjunction with FIG. 1, the target may be the woman and the scene may include areas other than the woman.

Operation 201 may be followed by operation 203, "associate depth information with $i^{th}$ pixel." The collected depth information may be associated with any pixel of image 100 (e.g., $i^{th}$ pixel). For example, depth information of the woman may be associated with some pixels (e.g., 3, 4, 9, 10, 15 and 16) of image 100, and other collected depth information may be associated with other pixels (e.g., 1, 2, 5, 6, 7, 8, 11, 12, 13, 14, 17 and 18) of image 100.

Operation 203 may be followed by operation 205, "select first set of pixels based on first set of lower ranked distances." The collected distances are ranked in an order from a minimum distance (e.g., ranked lowest) to a maximum distance (e.g., ranked highest). The ranked distances may be grouped into a first set of the lower ranked distances (from the minimum distance to a certain distance) and a second set of the higher ranked distances (from a distance subsequently ranked higher than the certain distance to the maximum distance). In some embodiments, the number of the ranked distances in the first set of the lower ranked distances may be predetermined. For example, it may predetermine that the first set of the lower ranked distances includes six ranked distances. Therefore, the first set of the lower ranked distances includes the six distances being ranked lowest among the ranked distances. In these embodiments, based on associations between the first set of lower ranked distances and pixels 3, 4, 9, 10, 15 and 16 in operation 203, pixels 3, 4, 9, 10, 15 and 16 are selected in operation 205.

Operation 205 may be followed by operation 207, "select second set of pixels based on second set of higher ranked distances." In some embodiments, the second set of higher ranked distances includes ranked distances other than the ranked distances included in the first set of the lower ranked distances. Therefore, the second set of higher ranked distances include all other ranked distance, except the six distances ranked lowest among the ranked distances. Based on associations between the second set of higher ranked distances and pixels 1, 2, 5, 6, 7, 8, 11, 12, 13, 14, 17 and 18 in operation 203, pixels 1, 2, 5, 6, 7, 8, 11, 12, 13, 14, 17 and 18 are selected in operation 207.

In some embodiments, the first set of pixels and the second set of pixels do not include any pixel corresponding to a "zero" distance, which usually resulting from a detection error of the depth sensor or an exceeding of a detection threshold of the depth sensor.

Operation 207 may be followed by operation 209, "calculate first APL associated with first set of pixels and total APL associated with first set and second set of pixels." In some embodiments, operation 209 includes calculating a first average pixel luminance (APL) associated with first set of pixels selected in operation 205. The first APL may be an average value of luminance of the first set of pixels. For example, in conjunction with FIG. 1, the first APL may be an average of luminance of pixel 3 (e.g., 921), luminance of pixel 4 (e.g., 840), luminance of pixel 9 (e.g., 866), luminance of pixel 10 (e.g., 833), luminance of pixel 15 (e.g., 732) and luminance of pixel 16 (e.g., 727). Accordingly, the first APL may be around 819.8.

In some embodiments, operation 209 also includes calculating a total APL associated with first set of pixels selected in operation 205 and second set of pixels selected in operation 207. The total APL may be an average value of luminance of the first set of pixels and the second set of pixels. For example, in conjunction with FIG. 1, the total APL may be an average of luminance of pixel 1 (e.g., 1728), luminance of pixel 2 (e.g., 2735), luminance of pixel 3 (e.g., 921), luminance of pixel 4 (e.g., 840), luminance of pixel 5 (e.g., 1860), luminance of pixel 6 (e.g., 2651), luminance of pixel 7 (e.g., 1923), luminance of pixel 8 (e.g., 2578), luminance of pixel 9 (e.g., 866), luminance of pixel 10 (e.g., 833), luminance of pixel 11 (e.g., 2020), luminance of pixel 12 (e.g., 2413), luminance of pixel 13 (e.g., 2196), luminance of pixel 14 (e.g., 2320), luminance of pixel 15 (e.g., 732) and luminance of pixel 16 (e.g., 727), luminance of pixel 17 (e.g., 2257) and luminance of pixel 18 (e.g., 2290). Accordingly, the total APL may be around 1771.7.

Operation 209 may be followed by operation 211, "obtain weighted APL based on first APL and total APL." In some embodiments, the weighted APL may be obtained based on Equation 1 below:

$$APL_{weight} = W_1 * APL_1 + W_2 * APL_{total} \quad \text{Equation 1}$$

in which $APL_1$ is the first APL, and $APL_{total}$ is the total APL calculated in block 209, respectively. $W_1$ and $W_2$ are weighting factors. In some embodiments, the sum of $W_1$ and $W_2$ is 1.

In some embodiments, as set forth above, $APL_1$ may be around 819.8 and $APL_2$ may be 1771.7. In response to $W_1$ is much greater than $W_2$, the weighted APL obtained in operation 211 will be very close to $APL_1$. Otherwise, the weighted APL obtained in operation 211 will be close to $APL_{total}$.

Operation 211 may be followed by operation 213, "control structured light based on weighted APL." In some embodiments, a current to drive the structured light is controlled based on the weighted APL. For example, the following table illustrates the relationship between the current to drive the structured light and the weighted APL.

| | Weighted APL | | | | | | | | |
|---|---|---|---|---|---|---|---|---|---|
| | 700 | 900 | 1100 | 1300 | 1500 | 1700 | 1900 | 2100 | 2300 |
| Current (mA) | 800 | 1000 | 1200 | 1400 | 1600 | 1800 | 2000 | 2200 | 2400 |

The value of $W_1$ and $W_2$ may be adjusted to fit in various scenarios. In some embodiments, in response to determining protecting the target's eyes being a higher priority, $W_1$ may be set much greater than $W_2$. In some other embodiments, in response to that the structured light will not be used in a living target, $W_2$ may be set much greater than $W_1$.

In the example of setting $W_1=1$ and $W_2=0$, $APL_{weight}$ equals to $APL_1$. According to $APL_{weight}$ of 819.8, the current to drive the structured light may be controlled between 800 mA and 1000 mA. Therefore, in conjunction with FIG. 1, the power of the structured light can be controlled to protect the woman's eyes. Otherwise, in response to the current to drive the structured light being much greater than 1000 mA (e.g., 2400 mA), the structured light will be too powerful for the woman's eyes and cause damages to the woman's eyes.

In some embodiments, operation 213 may be followed by operation 201 and operations 201 to 213 may be continuously repeated so that the structure light is controlled based on the latest two-dimensional image information obtained in operation 201 and depth information collected in operation 203.

More specifically, two-dimensional image information obtained in operation 201, depth information obtained and association between the obtained depth information and $i^{th}$ in operation 203, first set of pixels selected in operation 205, second set of pixels selected in operation 207, first APL and total APL calculated in operation 209, and weighted APL obtained in operation 211 will be updated. The generated structured light will be controlled and/or adjusted based on two-dimensional image information, depth information, first set of pixels, second set of pixels, first APL, total APL and weighted APL updated in operations 201 to 211.

In conjunction with FIG. 1, assuming another living target (e.g., a man) is entered between the woman and the depth sensor which makes the man is closer to the depth sensor than the woman. For example, the man may be captured in image 100 by pixels 5, 6, 11 and 12. Because the man is closer to the depth sensor than the woman, as set forth above, the first set of pixels may now be updated and include pixels 5, 6, 11, 12 and another two pixels (e.g., pixels 3 and 9). The second set of pixels may now be updated and include other pixels (e.g., pixels 1, 2, 4, 7, 8, 10 and 13-18). As set forth above, based on the updated first set of pixels, the updated first APL may now be smaller than the original first APL. In response to setting $W_1=1$ and $W_2=0$, the updated weighted APL will be smaller than the original weighted APL. Accordingly, the structured light will be adjusted to a lower power.

In some embodiments, in response to the woman leaving from the scene but the man staying in the scene, the first set of pixels may now be updated and include pixels 5, 6, 11, 12 and another two pixels (e.g., 17 and 18). The second set of pixels may be updated and include other pixels. Because pixels 5, 6, 11 and 12 still remain in the first set of pixels, the first APL will be still closer to the first APL that both the man and the woman are in the scene. Accordingly, the structured light may not be subsequently changed or adjusted.

Figure 3:
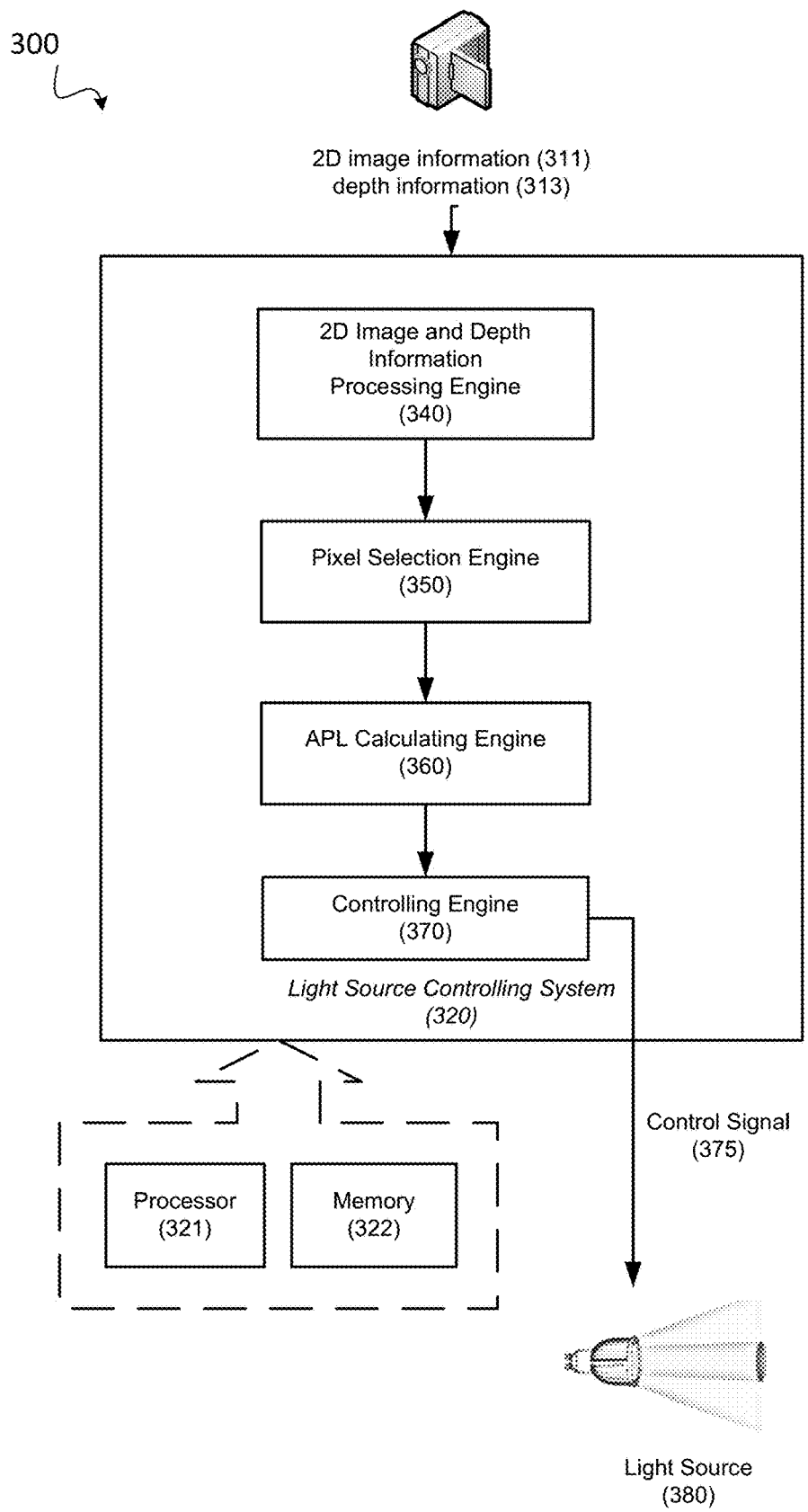
FIG. 3 illustrates a block diagram of a system configured to control a light source in structured light imaging, in accordance with at least some embodiments of the present disclosure.

FIG. 3 illustrates a block diagram of a system 300 configured to control a light source in structured light imaging, in accordance with at least some embodiments of the present disclosure.

In particular, light source controlling system 320 may be configured to process two-dimensional (2D) image information 311 and depth information 313 and generate control signals 375 to control light source 380 of a structured light. Light source controlling system 320 may be configured to include, without limitation, 2D image and depth information processing engine 340, pixel selection engine 350, APL calculating engine 360, controlling engine 370, processor 321, and/or a memory 322.

In some embodiments, 2D image information 311 and depth information 313 may be obtained and processed by 2D image and depth information processing engine 340, pixel selection engine 350, APL calculating engine 360 and controlling engine 370. In conjunction with FIG. 2, 2D image and depth information processing engine 340 may perform operations 201 and 203. In some embodiments, pixel selection engine 350 is configured to perform operations 205 and 207. In some other embodiments, APL calculating engine 360 is configured to perform operations 209 and 211, and controlling engine 370 is configured to perform operation 213.

In some embodiments, in conjunction with FIG. 2, light source controlling system 320 may utilize processor 321 to interact with 2D image and depth information processing engine 340, pixel selection engine 350, APL calculating engine 360 and/or controlling engine 370 to perform operations 201, 203, 205, 207, 209, 211 and/or 213. Processor 321 may be a microprocessor, graphics processing unit, or any processing unit that executes commands based on programmable instructions. In some embodiments, processor 321 may utilize memory 322 to execute the programmable instructions and store the intermediate processing results of 2D image and depth information processing engine 340, pixel selection engine 350, APL calculating engine 360 and/or controlling engine 370 for further processing with any of the engines set forth above in light source controlling system 220. Memory 222 may be in any form of non-transitory computer-readable storage medium including, but not limited to, random access memory (RAM), read-only memory (ROM), flash memory, conventional magnetic or optical disks, tape drives, or a combination of such devices.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method to control a light source in structured light imaging associated with a target, comprising:
obtaining two-dimensional image information and depth information of an image including the target and a scene associated with the target;
associating the depth information with pixels of the image;
selecting a first set of pixels of the pixels based on a first set of the depth information;
selecting a second set of pixels of the pixels based on a second set of the depth information;
calculating a first average pixel luminance (APL) associated with the first set of pixels and a total APL associated with the first set of pixels and the second set of pixels;
obtaining a weighted APL based on the first APL and the total APL; and
controlling the light source based on the weighted APL.

2. The method of claim 1, wherein the first set of pixels and the second set of pixels exclude any pixel corresponding to a zero distance included in the depth information.

3. The method of claim 1, wherein the depth information includes distances of various points of the targets and in the scene to a depth sensor configured to obtain the depth information.

4. The method of claim 3, further comprising ranking the distances from a minimum distance to a maximum distance.

5. The method of claim 4, wherein the first set of depth information includes a first set of the distances being lower ranked among the distances.

6. The method of claim 5, wherein the first set of pixels are selected based on the first set of the distances being lower ranked among the distances.

7. The method of claim 1, further comprising updating the first set of pixels and the second set of pixels in response to the image further including another target.

8. The method of claim 7, further comprising recalculating the first APL and the total APL, obtaining another weighted APL based on the recalculated first APL and the total APL and controlling the light source based on the another weighted APL.

9. A non-transitory computer-readable storage medium that includes a set of instructions which, in response to execution by a processor of a computing system, causes the processor to perform a method to control a light source in structured light imaging associated with a target, the method comprising:
obtaining two-dimensional image information and depth information of an image including the target and a scene associated with the target;
associating the depth information with pixels of the image;
selecting a first set of pixels of the pixels based on a first set of the depth information;
selecting a second set of pixels of the image based on a second set of the depth information;
calculating a first average pixel luminance (APL) associated with the first set of pixels and a total APL associated with the first set of pixels and the second set of pixels;
obtaining a weighted APL based on the first APL and the total APL; and
controlling the light source based on the weighted APL.

10. The non-transitory computer-readable storage medium of claim 9, wherein the depth information includes distances of various points of the targets and in the scene to a depth sensor configured to obtain the depth information.

11. The non-transitory computer-readable storage medium of claim 10, that includes additional instructions which, in response to execution by the processor, causes the processor to, rank the distances from a minimum distance to a maximum distance.

12. The non-transitory computer-readable storage medium of claim 11, wherein the first set of depth information includes a first set of the distances being lower ranked among the distances.

13. The non-transitory computer-readable storage medium of claim 9 that includes additional instructions which, in response to execution by the processor, causes the processor to, update the first set of pixels and the second set of pixels in response to the image further including another target.

14. The non-transitory computer-readable storage medium of claim 13 that includes additional instructions which, in response to execution by the processor, causes the processor to, recalculate the first APL and the total APL, obtain another weighted APL based on the recalculated first APL and the total APL and control the light source based on the another weighted APL.

15. An apparatus configured to control a light source in structured light imaging associated with a target, comprising:
a processor; and
a non-transitory computer-readable storage medium storing instructions, which in response to execution by the processor, cause the processor to:
obtain two-dimensional image information and depth information of an image including the target and a scene associated with the target;
associate the depth information with pixels of the image;
select a first set of pixels of the pixels based on a first set of the depth information;
select a second set of pixels of the pixels based on a second set of the depth information;
calculate a first average pixel luminance (APL) associated with the first set of pixels and a total APL associated with the first set of pixels and the second set of pixels;
obtain a weighted APL based on the first APL and the total APL; and
control the light source based on the weighted APL.

16. The apparatus of claim 15, wherein the depth information includes distances of various points of the targets and in the scene to a depth sensor configured to obtain the depth information.

17. The apparatus of claim 16, wherein the processor is further configured to rank the distances from a minimum distance to a maximum distance.

18. The apparatus of claim 17 wherein the first set of depth information includes a first set of the distances being lower ranked among the distances.

19. The apparatus of claim 18, wherein the first set of pixels are selected based on the first set of the distances being lower ranked among the distances.

20. The apparatus of claim 15, wherein the processor is further configured to update the first set of pixels and the second set of pixels in response to the image further including another target.

21. The apparatus of claim 20, wherein the processor is further configured to recalculate the first APL and the total APL, obtain another weighted APL based on the recalculated first APL and the total APL and control the light source based on the another weighted APL.

* * * * *